United States Patent
Chen (10) Patent No.: US 7,123,975 B2
(45) Date of Patent: Oct. 17, 2006

(54) MANUFACTURING MANAGEMENT SYSTEM AND METHOD

(75) Inventor: Hsieh-Chi Chen, Miaoli Hsien (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 180 days.

(21) Appl. No.: 10/896,673

(22) Filed: Jul. 22, 2004

(65) Prior Publication Data

US 2006/0020358 A1    Jan. 26, 2006

(51) Int. Cl.
  *G06F 19/00*    (2006.01)

(52) U.S. Cl. .................... 700/96; 700/99; 700/106

(58) Field of Classification Search ........ 700/106–107, 700/96–97, 99; 705/22, 28
See application file for complete search history.

(56) References Cited

U.S. PATENT DOCUMENTS

| | | | |
|---|---|---|---|
| 6,240,335 B1* | 5/2001 | Wehrung et al. | 700/230 |
| 6,317,725 B1* | 11/2001 | Muraoka | 705/28 |
| 6,345,208 B1* | 2/2002 | Yoshiyuki | 700/97 |
| 6,345,259 B1* | 2/2002 | Sandoval | 705/7 |
| 6,477,432 B1* | 11/2002 | Chen et al. | 700/51 |
| 6,647,316 B1* | 11/2003 | Bahri et al. | 700/217 |
| 6,662,076 B1* | 12/2003 | Conboy et al. | 700/214 |
| 6,705,523 B1* | 3/2004 | Stamm et al. | 235/385 |
| 6,976,033 B1* | 12/2005 | Yang et al. | 707/104.1 |
| 2003/0083947 A1* | 5/2003 | Hoffman et al. | 705/22 |
| 2003/0200130 A1* | 10/2003 | Kall et al. | 705/8 |
| 2004/0158339 A1* | 8/2004 | Kawase et al. | 700/97 |

* cited by examiner

*Primary Examiner*—Leo Picard
*Assistant Examiner*—Alexander Kosowski
(74) *Attorney, Agent, or Firm*—Thomas, Kayden, Horstemeyer & Risley (57) ABSTRACT

A manufacturing management system and method for cross-site lot handling is provided. The system includes a management unit and a target manufacturing site. The target manufacturing site receives a lot, checks whether a lot handling request indicating the lot and the target manufacturing site exists in the management unit, and registers the lot handling request for the lot before the lot being processed if the lot handling request exists.

17 Claims, 7 Drawing Sheets

MANUFACTURING MANAGEMENT SYSTEM AND METHOD

BACKGROUND

The invention relates to manufacturing management, and particularly to a manufacturing management system and method for cross-site lot handling.

Figure 1:
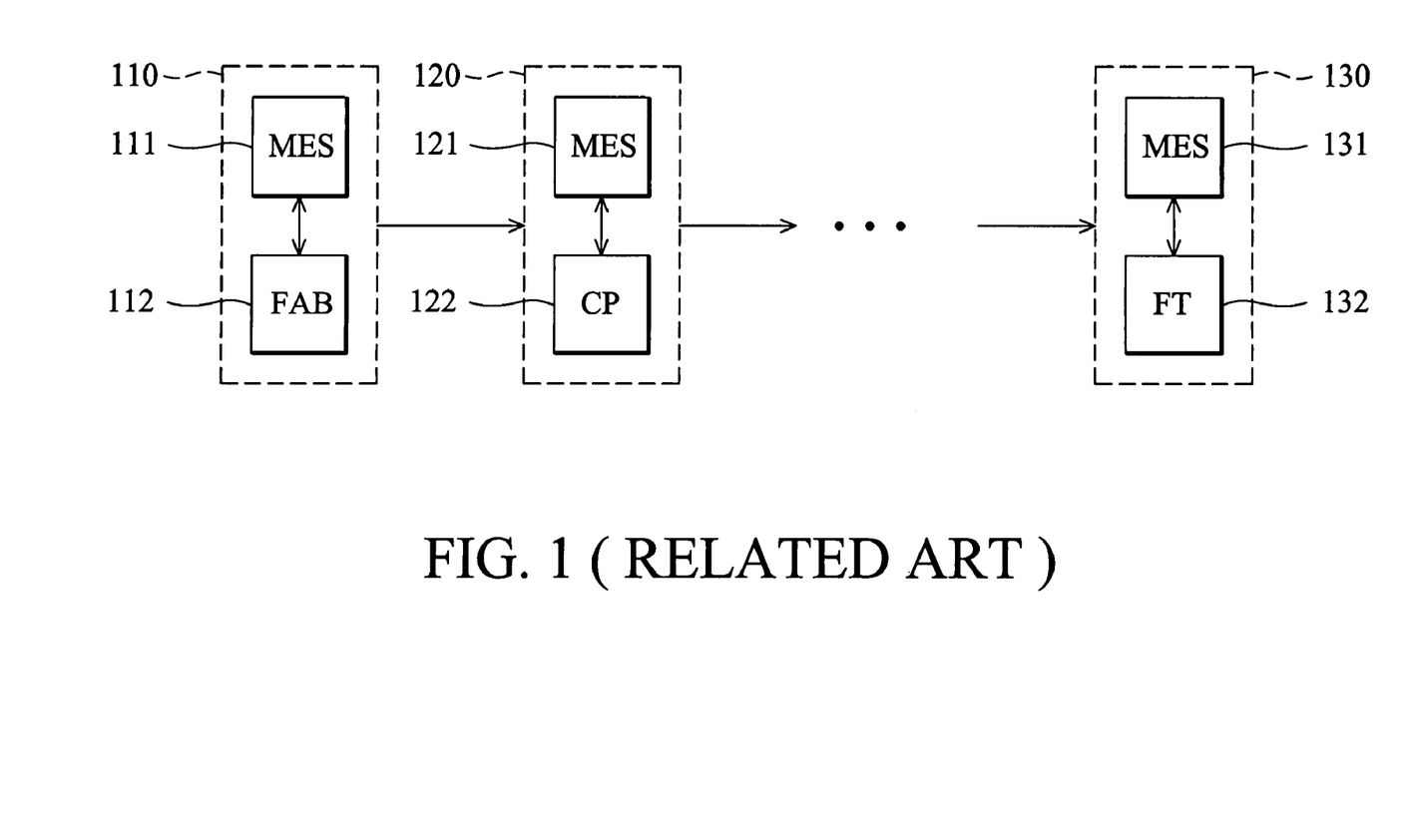
FIG. 1 is a schematic diagram illustrating a conventional manufacturing procedure.

In semiconductor manufacturing, several manufacturing layers including FAB (Fabrication), CP (Circuit Probe), BP (Bumping), CF (Color Filter), ASM (Assembly), FT (Final Test), and others are required to the complete manufacturing. Additionally, several manufacturing sites may be provided for each manufacturing layer. Conventionally, each manufacturing site is controlled by one MES. FIG. 1 is a schematic diagram illustrating a conventional manufacturing procedure. In this procedure, the manufacturing site FAB 112 in manufacturing layer FAB 110 is controlled by MES 111, CP 122 in manufacturing layer CP 120 is controlled by MES 121, and FT 130 in manufacturing layer FT 130 is controlled by MES 131. One wafer may go through several manufacturing layers to become final products. After a lot is completed from manufacturing site FAB 112, the lot information is then transmitted from MES 111 and created in MES 121.

Future lot handling, such as Future Hold, is important and fundamental for quality control in a foundry MES (Manufacturing Execution System). Future Hold is a fundamental function for holding wafers or lots at a specific operational stage or step for inspection or further special manufacturing instruction. After the wafer scheduling process is complete and released to the MES, Future Hold can be registered by users or by the MES. The prerequisite for future lot handling, however, is that wafers should be first created in the MES. There is no way to perform future lot handling for wafers which have not been created in the MES.

In the CP manufacturing layer, for example, wafers typically come from the FAB manufacturing layer with a short cycle time. Conventionally, CP users cannot register a lot handling record for these wafers prior to creation thereof in the CP MES. Since the cycle time is short and there is no sufficient lead time to set a lot handling record, client special inspection instructions may easily go unheeded, resulting in damage to product quality, and raises client complaints. Further, since the operation is performed manually, it is manpower and time-consuming.

Furthermore, some clients may have their own manufacturing plans after they send orders to the supplier. Setting a lot handling record is a trigger point for their manufacturing plans. Conventionally, clients have to continuously monitor whether their wafers have been released to production or not. Only after wafers are released to production can the lot handling record be registered. The monitoring process for clients is inefficient.

SUMMARY

An embodiment of the invention is thus proposed to address the aforementioned issues. It is noted that this embodiment, among others, is applicable to any factory, service supplier, and/or product.

An embodiment of the invention provides a manufacturing management system and method for cross-site lot handling. According to an embodiment of the invention, the system includes a management unit and a target manufacturing site. The target manufacturing site receives a lot, checks whether a lot handling request indicating the lot and the target manufacturing site exists in the management unit, and registers the lot handling request for the lot before the lot currently being processed if the lot handling request exists.

The management unit further transforms the lot handling request for the target manufacturing site automatically, or in response to a direction indicating the target manufacturing site for the lot from a first manufacturing site when the lot is processed thereon.

The management unit further transmits lot handling information corresponding to the lot handling request to the target manufacturing site if the lot handling request exists, and the target manufacturing site registers the lot handling request according to the lot handling information.

The management unit further determines whether the lot handling request is a consistency request, and cancels the lot handling request after the lot handling information is transmitted to the target manufacturing site if the lot handling request is not a consistency request.

This embodiment of the invention provides a manufacturing management method. First, a lot is received by a target manufacturing site. It is checked whether a lot handling request indicating the lot and the target manufacturing site exists. If the lot handling request exists, the lot handling request for the lot is registered at the target manufacturing site before the lot currently being processed.

The lot handling request is further transformed for the target manufacturing site automatically, or in response to a direction indicating the target manufacturing site for the lot from a first manufacturing site when the lot is processed thereon.

If the lot handling request exists, lot handling information corresponding to the lot handling request is further transmitted to the target manufacturing site, and the target manufacturing site registers the lot handling request accordingly.

It is further determined whether the lot handling request is a consistency request. If the lot handling request is not a consistency request, the lot handling request is canceled after the lot handling information is transmitted to the target manufacturing site.

The above-mentioned method may take the form of program code embodied in a tangible media. When the program code is loaded into and executed by a machine, the machine can become an apparatus for practicing the disclosed methods.

BRIEF DESCRIPTION OF THE DRAWINGS

The aforementioned features and advantages will become apparent by referring to the following detailed description with reference to the accompanying drawings, wherein.

DESCRIPTION

Figure 2:
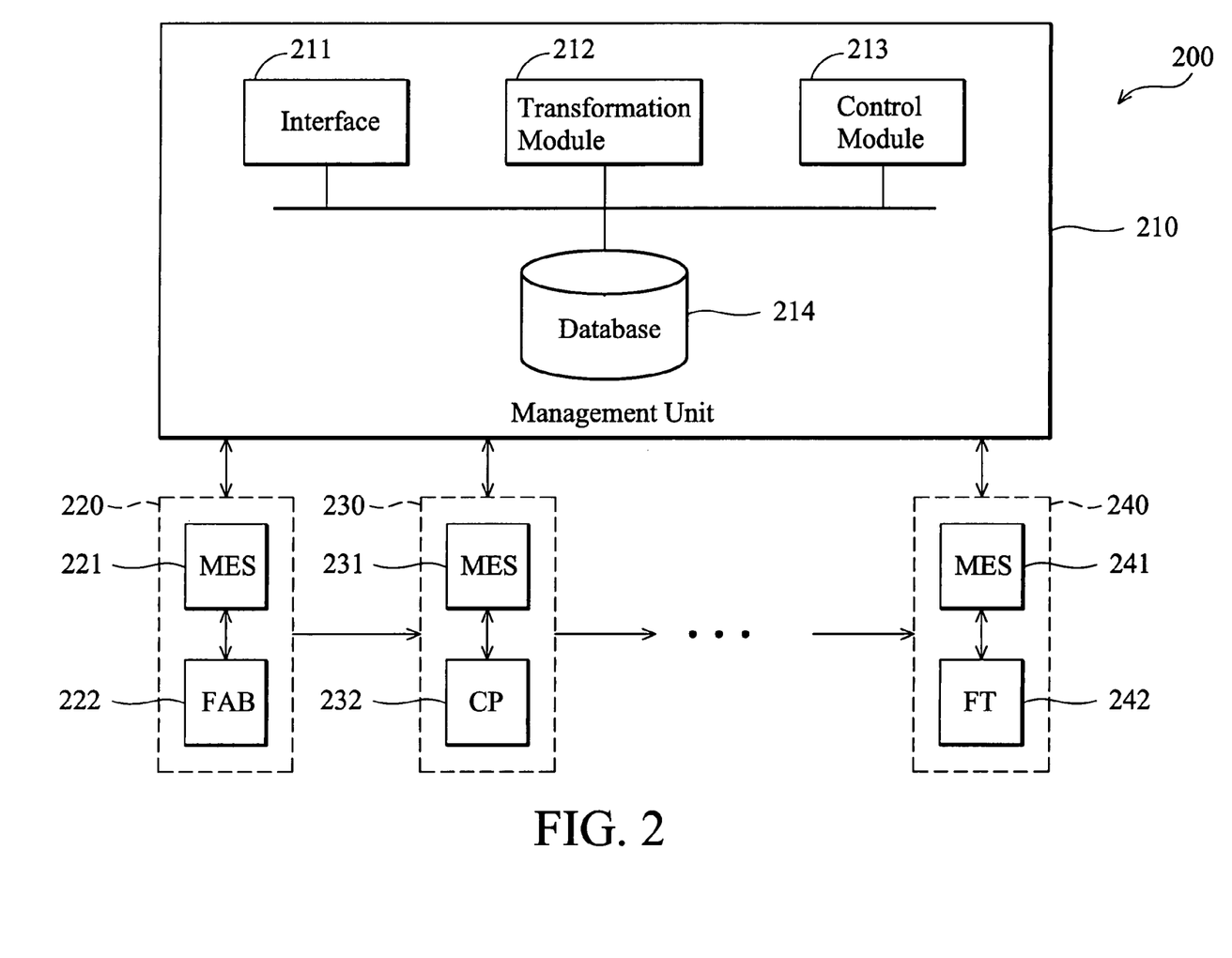
FIG. 2 is a schematic diagram illustrating the architecture of the manufacturing management system according to an embodiment of the invention.

FIG. 2 is a schematic diagram illustrating the architecture of the manufacturing management system according to an embodiment of the invention. The manufacturing management system 200 includes a management unit 210 and a plurality of manufacturing layers 220, 230 and 240. Each manufacturing layer comprises at least one manufacturing site and a corresponding MES (Manufacturing Execution System) controlling the manufacturing site. In this embodiment, the manufacturing layer 220 includes a manufacturing site FAB 222 controlled by a MES 221, the manufacturing layer 230 includes a manufacturing site CP 232 controlled by a MES 231, and the manufacturing layer 240 includes a manufacturing site FT 242 controlled by a MES 241. It is understood that the manufacturing layers and/or sites may includes a FAB (Fabrication), CP (Circuit Probe), BP (Bumping), CF (Color Filter), ASM (Assembly), FT (Final Test), and others.

The management unit 210 includes an interface 211, a transformation module 212, a control module 213, and a database 214. In an example, the interface 211 may be a web-based interface, and lot handling requests can be received by the management unit 210 from clients and/or in-house personnel via the interface 211. It is understood that embodiments of the invention can be integrated with a web-based platform providing online service and displaying related information to clients. Furthermore, the interface 211 may be designed as a Graphical user interface (GUI), providing an end user environment that is graphical, such that the end user interfaces with the environment via a variety of elements on a display screen including windows, icons, menus, pointing devices, and others. Clients can input lot handling requests via the interface 211 by selecting a predefined lot handling type and related information.

The lot handling type may include Future Lot Hold, Future Lot Split, Future Lot Merge, Future Lot Order Change, Future Lot Sub Route Branch, and others. The information may comprise at least specific lot identification, a specific target manufacturing layer, and conditions for corresponding selected lot handling type. It is understood that the lot identification can be replaced by specific identification, such as production type identification. If one lot handling request includes specific production type identification, the request represents all lots belonging to the production type must perform the lot handling request. Since the production route indicating stages and/or equipment tools that lots must pass is determined by the supplier, and clients may not have detailed information, the lot handling request from clients may optionally include a specific target manufacturing site.

Since several manufacturing layers are involved in the system, and corresponding manufacturing sites are controlled by different MES, the format for respective MES is different. The transformation module 212 transforms lot handling requests for respective manufacturing sites. The control module 213 stores lot handling requests in the database 214, receives lot handling request queries from manufacturing sites, and performs related management. The control module 213 further determines whether respective lot handling requests are consistency requests. If the lot handling request is not a consistency request, the control module 213 cancels the lot handling request after the lot handling request is registered at specific manufacturing site. Detailed operation of the control module 213 is discussed later.

Figure 3:
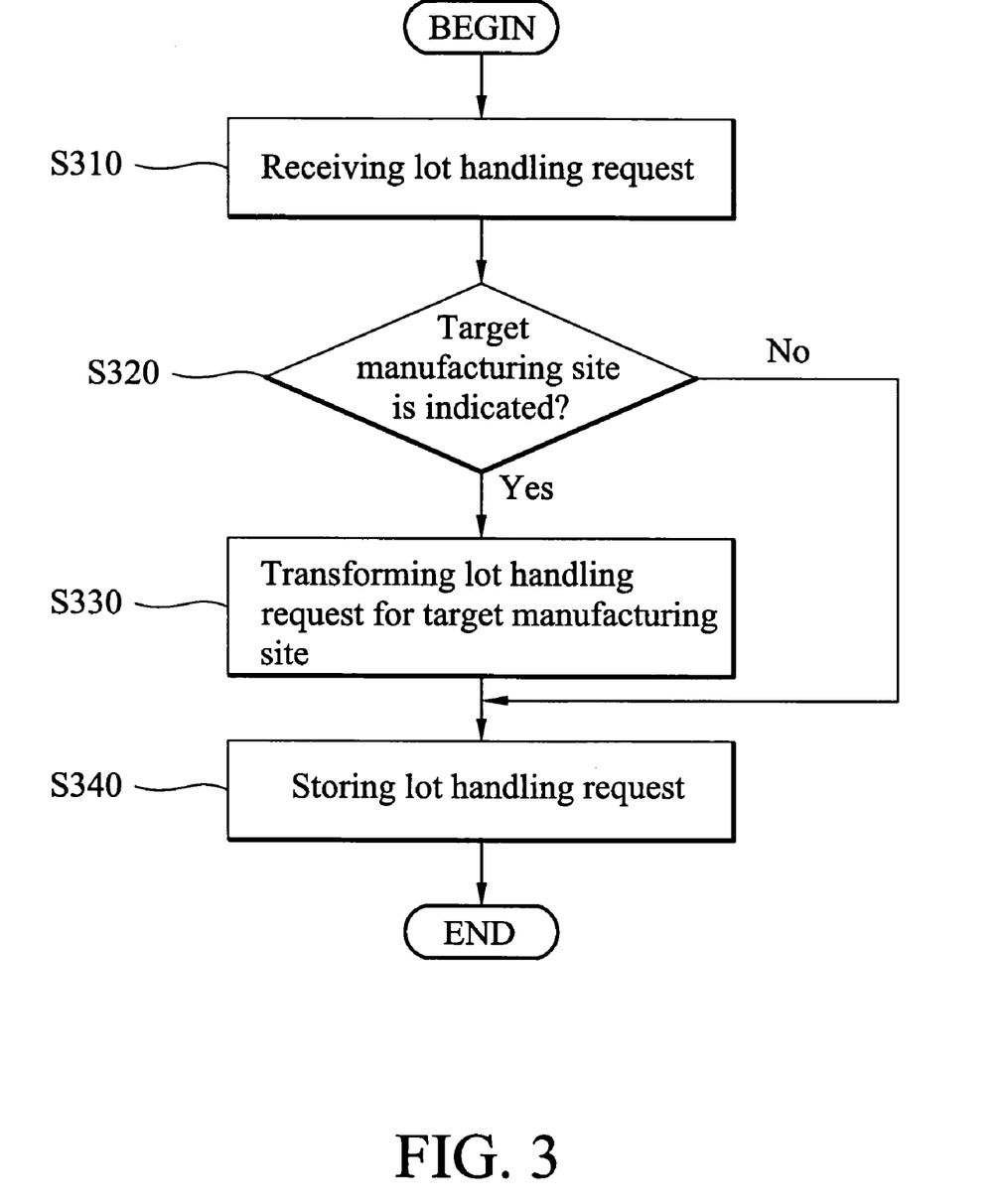
FIG. 3 is a flowchart showing management for lot handling request according to an embodiment of the invention.

FIG. 3 is a flowchart showing management for lot handling request according to an embodiment of the invention. First, in step S310, at least one lot handling request is received. In step S320, it is checked whether a target manufacturing site is indicated by the lot handling request. If not, the procedure goes to step S340. If yes, in step S330, the transformation module 212 transforms the lot handling request for the target manufacturing site. Then, in step S340, the control module 213 stores the lot handling request in the database 214. It is understood that the control module 213 further classifies and stores the lot handling request according to the target manufacturing site.

Figure 4:
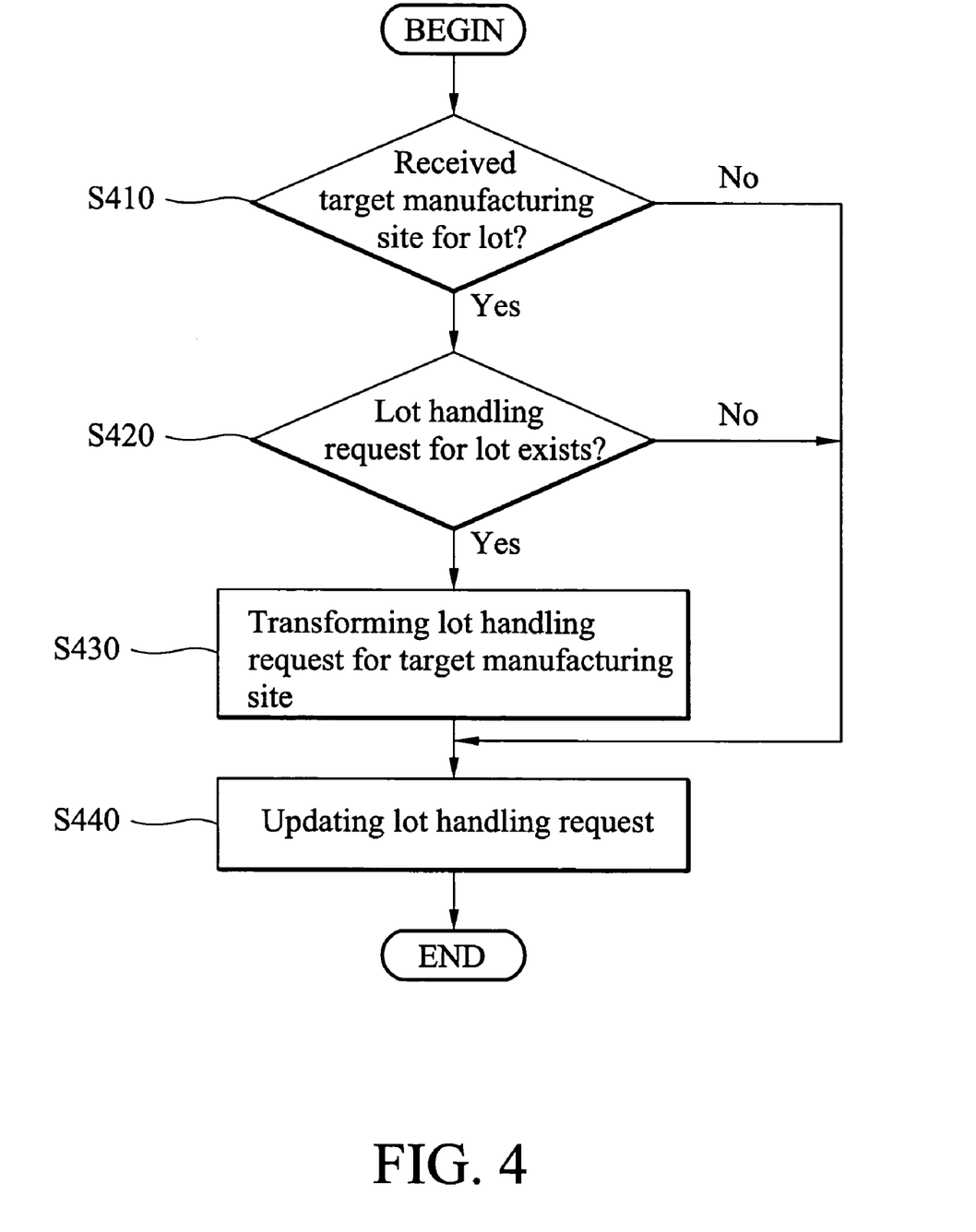
FIG. 4 is a flowchart showing transformation for a lot handling request in response to a direction according to an embodiment of the invention.

If no target manufacturing site is indicated by the lot handling request, the transformation can be performed in response to a direction generated by one manufacturing site. FIG. 4 is a flowchart showing transformation for lot handling request in response to a direction according to an embodiment of the invention. In step S410, it is determined whether a direction indicating a lot and a target manufacturing site is received. It is understood that the direction may be generated when processing of the wafer lot begins (wafer start), or is transmitted from one of the manufacturing sites when the lot is processed thereon. If not, the procedure is complete. If yes, in step S420, it is checked whether any lot handling request for the indicated lot exists. If not, the procedure is complete. If yes, in step S430, the transformation module 212 transforms the lot handling request for the target manufacturing site. Then, in step S440, the control module 213 updates the lot handling request in the database 214.

Figure 5:
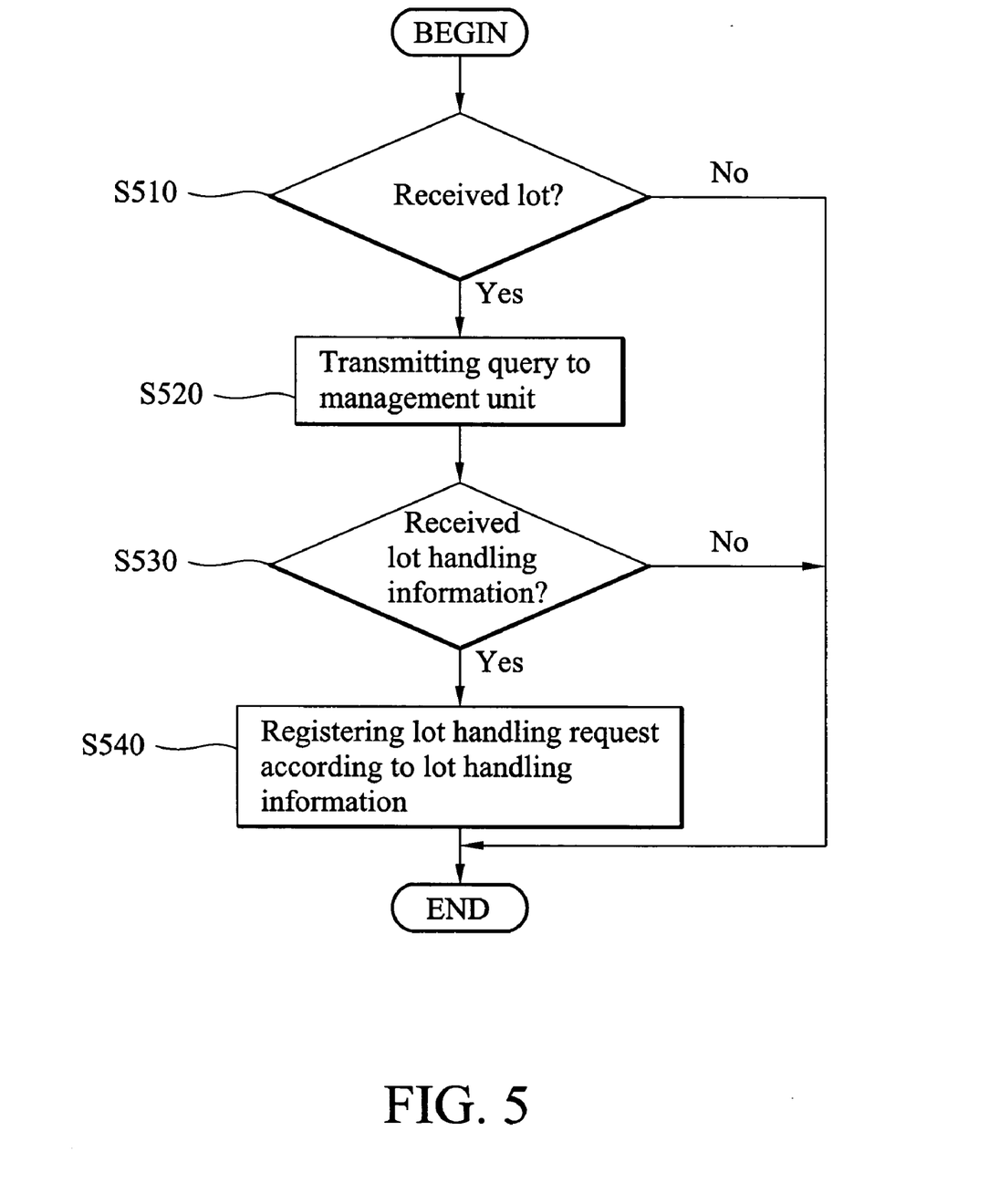
FIG. 5 is a flowchart showing the operation of a manufacturing site according to an embodiment of the invention.
Figure 6:
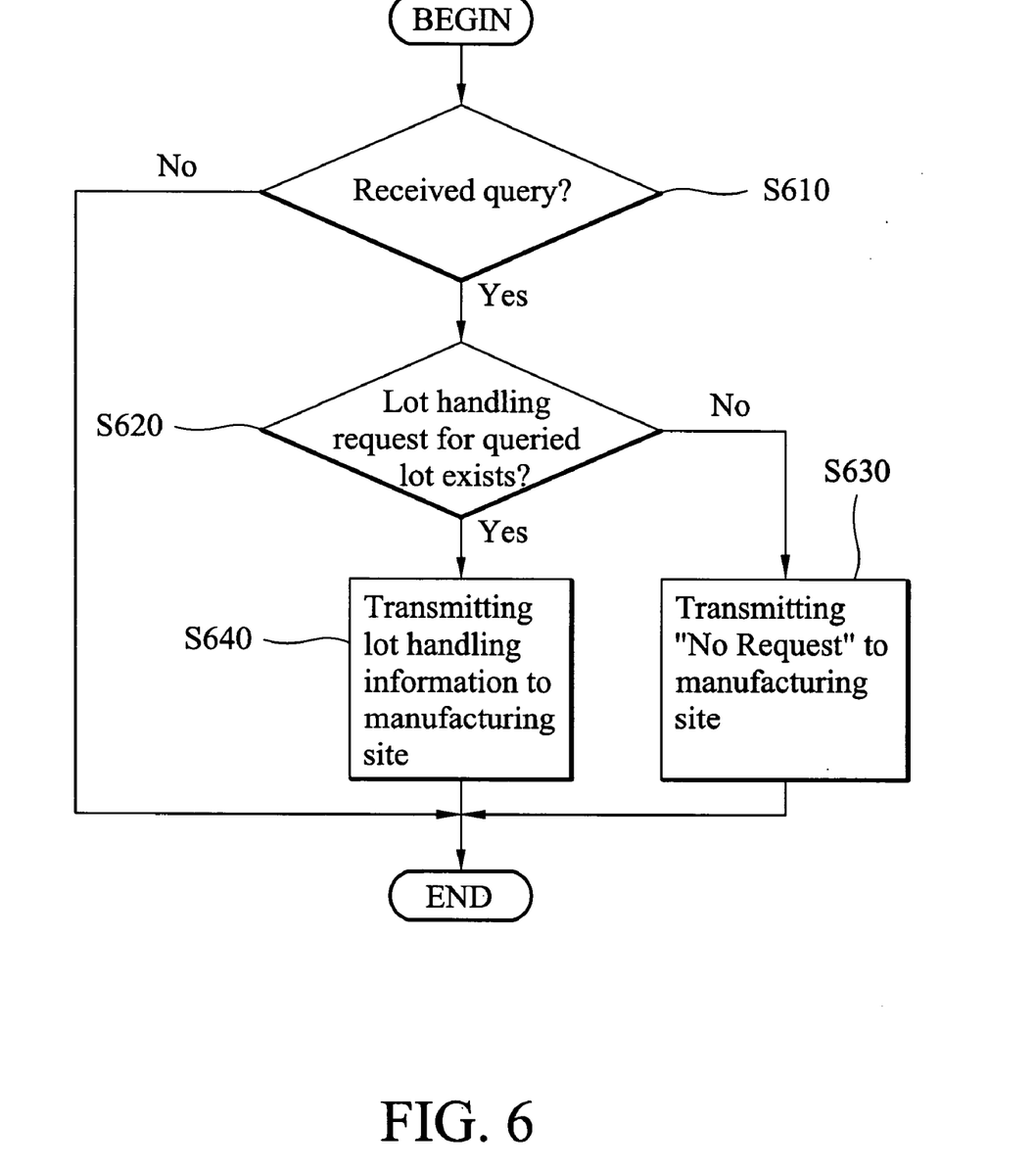
FIG. 6 is a flowchart showing query handling according to an embodiment of the invention.

FIG. 5 shows the operation of a manufacturing site, and FIG. 6 shows query handling according to an embodiment of the invention. In FIG. 5, in step S510, the manufacturing site checks whether at least one lot is received. If not, the procedure is complete. If yes, in step S520, the manufacturing site transmits a query to the management unit 210 for checking whether any lot handling request for the lot exists. Referring to FIG. 6, in step S610, the control module 213 determines whether any query has been received from a manufacturing site. If not, the procedure is complete. Once a query indicating specific lot identification is received from the manufacturing site, in step S620, it is determined whether any lot handling request for the lot exists. If not, in step S630, the control module 213 returns a data signal representing "No Request" to the manufacturing site. If yes, in step S640, the control module 213 transmits lot handling information, such as inspection conditions corresponding to the lot handling request to the manufacturing site. It is understood that the control module 213 further determines whether a respective lot handling request is a consistency request. If the lot handling request is not a consistency request, the control module 213 cancels the lot handling request after the lot handling information is transmitted to the manufacturing site.

Referring to FIG. 5 again, in step S530, the manufacturing site checks whether any lot handling information is received from the management unit 210. If not, the procedure is complete. If yes, in step S540, the manufacturing site registers the lot handling request accordingly before the lot currently being processed. After registration, the lot begins to be processed at the manufacturing site, and the lot handling request is performed on the lot when it complies with the lot handling request. For example, the lot is hold for experiment when it reaches a specific stage indicated by the lot handling request.

Figure 7:
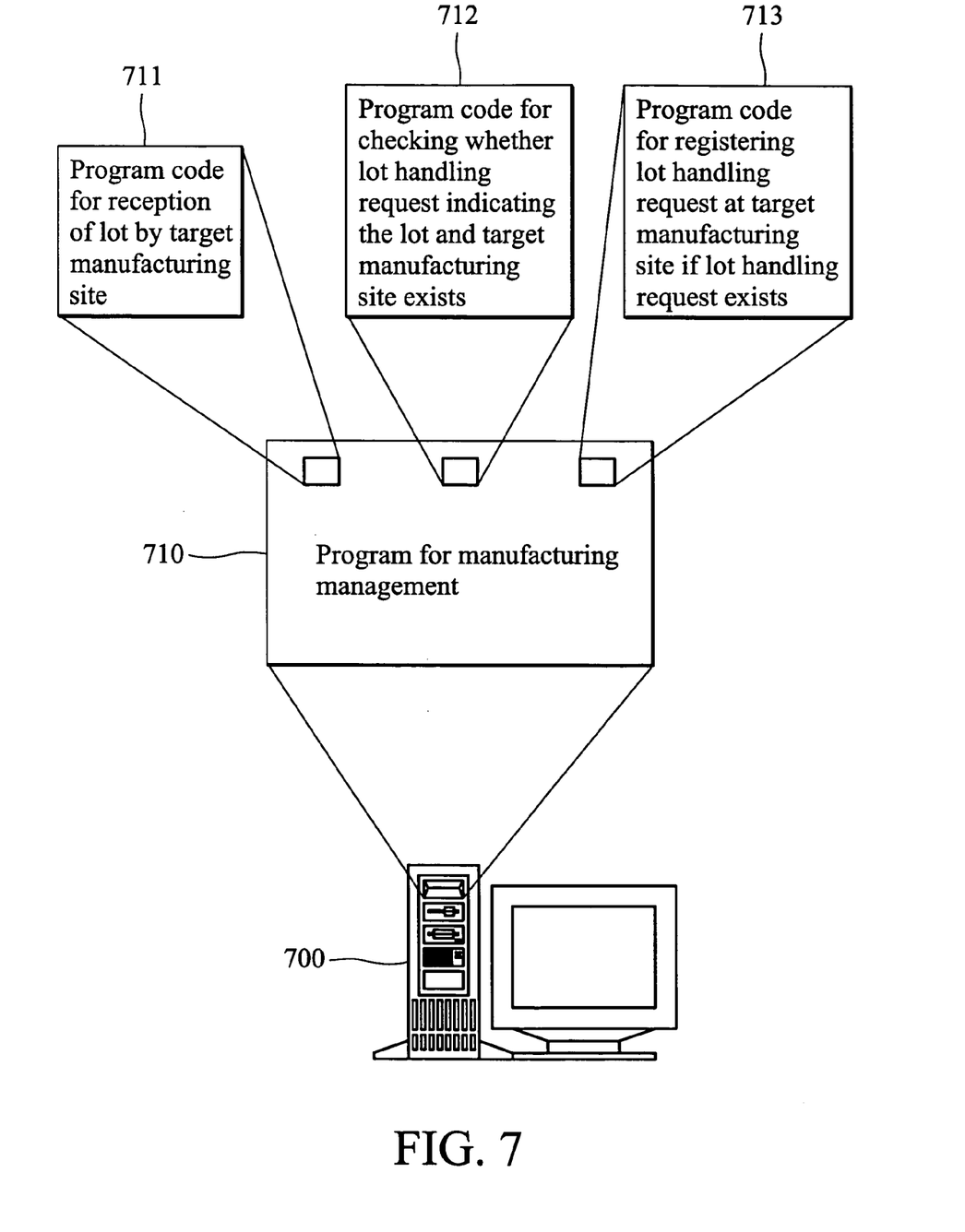
FIG. 7 is a schematic diagram illustrating a storage medium storing a computer program for execution of the manufacturing management method according to an embodiment of the invention.

FIG. 7 is a diagram of a storage medium storing a computer program providing the manufacturing management method for cross-site lot handling according to an embodiment of the invention. The computer program product comprises a storage medium 710 having computer readable program code embodied therein for use in a computer system 700. The computer readable program code comprises at least computer readable program code 711 reception of a lot by a target manufacturing site, computer readable program code 712 checking whether a lot handling request indicating the lot and the target manufacturing site exists, and computer readable program code 713 registering the lot handling request for the lot at the target manufacturing site before the lot being processed if the lot handling request exists.

An embodiment of the invention thus provides a manufacturing management system and method that integrates multiple MES, and provides cross-site lot handling and registration, thereby improving accuracy of lot handling, saving manpower and time for system operation, and improving throughput.

Embodiments of the method and system, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the embodiment. The method and system may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed embodiment. When implemented on a general-purpose processor, the program code combines with the processor to provide a unique apparatus that operates analogously to application specific logic circuits.

Although an embodiment of the invention has been described, it is not intended to limit the invention thereto. Those skilled in this technology can still make various alterations and modifications without departing from the scope and spirit disclosed.

What is claimed is:

1. A manufacturing management system for cross-site lot handling, comprising:
    a management unit; and
    a target manufacturing site to receive a lot, query whether a lot handling request indicating the lot and the target manufacturing site exists in the management unit, and if the lot handling request exists, receive lot handling information corresponding to the lot handling request from the management unit, and register the lot handling request for the lot accordingly before the lot currently being processed.

2. The system of claim 1 wherein the management unit further transforms the lot handling request for the target manufacturing site.

3. The system of claim 1 wherein the management unit further receives a direction indicating the target manufacturing site for the lot from a first manufacturing site when the lot is processed thereon.

4. The system of claim 3 wherein the management unit further transforms the lot handling request for the target manufacturing site in response to the direction.

5. The system of claim 3 wherein the first manufacturing site and the target manufacturing site are controlled by different manufacturing execution systems.

6. The system of claim 1 wherein the management unit further determines whether the lot handling request is a consistency request, and cancels the lot handling request after the lot handling information is transmitted to the target manufacturing site if the lot handling request is not a consistency request.

7. The system of claim 1 wherein the target manufacturing site comprises fabrication, circuit probe, bumping, color filter, assembly, or final test sites.

8. A manufacturing management method for cross-site lot handling, comprising the steps of:
    reception of a lot by a target manufacturing site;
    checking whether a lot handling request indicating the lot and the target manufacturing site exists;
    receiving lot handling information corresponding to the lot handling request if the lot handling request exists; and
    registering the lot handling request for the lot at the target manufacturing site accordingly before the lot currently being processed.

9. The method of claim 8 further comprising transforming the lot handling request for the target manufacturing site.

10. The method of claim 8 further comprising receiving a direction indicating the target manufacturing site for the lot from a first manufacturing site when the lot is processed thereon.

11. The method of claim 10 further comprising transforming the lot handling request for the target manufacturing site in response to the direction.

12. The method of claim 10 wherein the first manufacturing site and the target manufacturing site are controlled by different manufacturing execution systems.

13. The method of claim 8 further comprising determining whether the lot handling request is a consistency request, and canceling the lot handling request after the lot handling information is received by the target manufacturing site if the lot handling request is not a consistency request.

14. The method of claim 8 wherein the target manufacturing site comprises fabrication, circuit probe, bumping, color filter, assembly, or final test sites.

15. A machine-readable storage medium storing a computer program, causing when executed a computer to perform a manufacturing management method for cross-site lot handling, comprising:
    reception of a lot by a target manufacturing site;
    checking whether a lot handling request indicating the lot and the target manufacturing site exists;
    receiving lot handling information corresponding to the lot handling request if the lot handling request exists; and
    registering the lot handling request for the lot at the target manufacturing site accordingly before the lot currently being processed.

16. The storage medium of claim 15, the method further comprising transforming the lot handling request for the target manufacturing site.

17. The storage medium of claim 15, the method further comprising determining whether the lot handling request is a consistency request, and canceling the lot handling request after the lot handling information is received by the target manufacturing site if the lot handling request is not a consistency request.

* * * * *